(12) United States Patent
DeRosa

(10) Patent No.: US 9,051,457 B2
(45) Date of Patent: *Jun. 9, 2015

(54) CERAMIC PRECURSOR BATCH COMPOSITIONS FOR INCREASED $T_{onset}$

(71) Applicant: Corning Incorporated, Corning, NY (US)

(72) Inventor: Rebecca L DeRosa, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 245 days.

This patent is subject to a terminal disclaimer.

(21) Appl. No.: 13/688,930

(22) Filed: Nov. 29, 2012

(65) Prior Publication Data

US 2013/0133550 A1    May 30, 2013

Related U.S. Application Data

(60) Provisional application No. 61/564,944, filed on Nov. 30, 2011.

(51) Int. Cl.
| | |
|---|---|
| *C04B 35/18* | (2006.01) |
| *C04B 38/02* | (2006.01) |
| *C04B 35/63* | (2006.01) |
| *C08L 1/28* | (2006.01) |
| *C04B 35/185* | (2006.01) |
| *C04B 35/195* | (2006.01) |
| *C04B 35/478* | (2006.01) |
| *C04B 35/636* | (2006.01) |
| *C04B 38/00* | (2006.01) |
| *C08K 3/22* | (2006.01) |
| *C04B 111/00* | (2006.01) |

(52) U.S. Cl.
CPC . *C08L 1/284* (2013.01); *C08L 1/28* (2013.01); *C08K 2003/2227* (2013.01); *C04B 35/185* (2013.01); *C04B 35/195* (2013.01); *C04B 35/478* (2013.01); *C04B 35/6365* (2013.01); *C04B 38/0006* (2013.01); *C04B 2111/00793* (2013.01); *C04B 2111/0081* (2013.01)

(58) Field of Classification Search
CPC .. C04B 35/6365; C04B 35/18; C04B 35/185; C04B 35/195; C04B 38/0006; C04B 38/02; C04B 2111/00793; C04B 2111/0081; C04B 2235/6021; C04B 35/478; C08L 1/28; C08L 1/284; C08K 2003/2227
USPC ............ 106/172.1, 175.1, 197.01, 198.1
See application file for complete search history.

(56) References Cited

U.S. PATENT DOCUMENTS

| | | | | |
|---|---|---|---|---|
| 7,704,296 | B2 | 4/2010 | Merkel | ............ 55/523 |
| 8,641,815 | B2* | 2/2014 | Crume | ......... 106/162.8 |
| 8,728,224 | B2* | 5/2014 | Niinobe | ....... 106/197.01 |
| 2009/0218711 | A1 | 9/2009 | Dasher et al. | ........... 264/43 |
| 2010/0117272 | A1* | 5/2010 | Derosa | ............ 264/631 |

* cited by examiner

*Primary Examiner* — David M Brunsman
(74) *Attorney, Agent, or Firm* — Charles A. Greene; Matthew J. Mason

(57) ABSTRACT

A precursor batch composition that can be used to make porous ceramic articles is provided. The batch composition includes a cellulose-based polymer and, in particular, a methylcellulose showing a specified micro-calorimetry thermal response fingerprint that correlates to an increased $T_{onset}$.

12 Claims, 1 Drawing Sheet

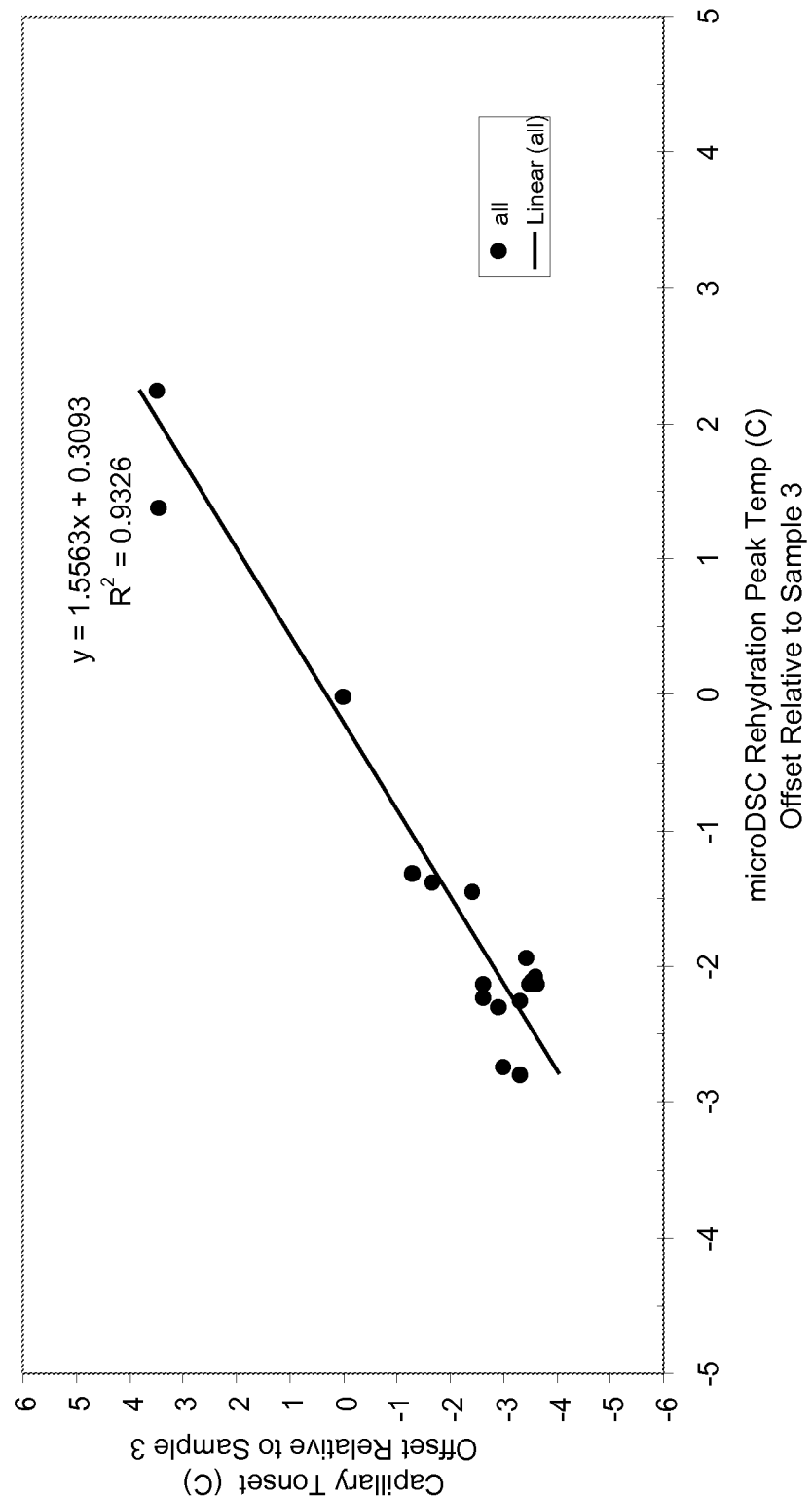

CERAMIC PRECURSOR BATCH COMPOSITIONS FOR INCREASED $T_{onset}$

This application claims the benefit of priority under 35 U.S.C. §119 U.S. Provisional Application Ser. No. 61/564,944 filed on Nov. 30, 2011 the content of which is relied upon and incorporated herein by reference in its entirety.

BACKGROUND

The disclosure relates generally to ceramic precursor batch compositions and more particularly to ceramic precursor batch compositions and batches for forming ceramic honeycombs.

In the formation of ceramic bodies, e.g., silicon carbide, cordierite, mullite, alumina, or aluminum titanate bodies, plasticized mixtures of various inorganic powder batches are prepared which are then formed into various shapes. These plasticized mixtures should be well blended and homogeneous in order for the resulting shaped body to have relatively good integrity in both size and shape, and uniform physical properties. These mixtures typically further include organic additives such as binders, plasticizers, surfactants, lubricants, and dispersants as processing aids to enhance cohesion, plasticity, lubricity, and/or wetting, and therefore to produce a more uniform batch.

Cellulose ethers have been used as extrusion binders to impart plasticity while imparting good drying behavior. While other ceramic binder systems can also be used for ceramic extrusion, cellulose ethers such as methylcellulose (MC), hydroxypropylcellulose (HPMC) and hydroxyethylmethylcellulose (HEMC) can form high temperature gels. The gelling behavior facilitates rapid drying while preventing distortions that can occur with other binder systems as they are heated.

In order to form the batches described above into various shapes, the batch materials are usually fed through an extruder. The rate at which the batch materials can be fed through the extruder is limited in part by the $T_{onset}$ of the batch. $T_{onset}$ refers to the temperature at which the rheology of the batch begins to transition from low to high viscosity. Higher $T_{onset}$ can enable greater batch feed rate and higher batch feed rate can result in reduced processing costs.

SUMMARY

One embodiment of the disclosure relates to a ceramic precursor batch composition. The ceramic precursor batch composition includes inorganic ceramic-forming ingredients and a cellulose-based polymer. The cellulose-based polymer includes a methylcellulose showing a concentrated micro-calorimetry thermal response comprising, upon rehydration and dissolution, an exothermic peak below a transition onset temperature. The exothermic peak has a maximum intensity at a temperature of at least 52° C.

Another embodiment of the disclosure relates to a method of producing a ceramic precursor batch composition. The method includes compounding inorganic ceramic-forming ingredients and a cellulose-based polymer. The cellulose-based polymer includes a methylcellulose showing a concentrated micro-calorimetry thermal response comprising, upon rehydration and dissolution, an exothermic peak below a transition onset temperature. The exothermic peak has a maximum intensity at a temperature of at least 52° C.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 1 plots a relationship between peak maximum intensity temperature upon rehydration and dissolution of a cellulose-based polymer using the concentrated micro-calorimetry test method disclosed herein and batch $T_{onset}$.

DETAILED DESCRIPTION

Various embodiments of the disclosure will be described in detail with reference to the drawings, if any.

"Concentrated micro-calorimetry thermal response" refers to the thermal response of a material subjected to the concentrated micro-calorimetry test method described herein.

"$T_{onset}$" refers to the temperature at which the rheology of the batch begins to transition from low to high viscosity. When referenced herein, $T_{onset}$ was determined by using a temperature sweep in a capillary rheometer, where the value was defined as the temperature at which the capillary pressure increases by 15% above the stable baseline pressure during extrusion through a zero length capillary die.

"Methylcellulose" refers to a class of cellulose-based polymers that are cellulose ethers having at least some degree of methoxy substitution and may also optionally have additional molar substitution, such as hydroxypropyl substitution to form hydroxypropyl methylcellulose (HPMC).

"Methoxy degree of substitution" is the average number of methoxy groups attached per anhydroglucose unit of a cellulose-based polymer.

"Hydroxypropyl molar substitution" is the number of moles of hydroxypropyl groups per molecule of anhydroglucose in a cellulose-based polymer.

Compositions disclosed herein can, in exemplary embodiments, have a higher $T_{onset}$. For example, ceramic precursor batch compositions can have a $T_{onset}$ of at least 1° C. higher, such as at least 2° C. higher, and further such as at least 3° C. higher, and yet further such as at least 4° C. higher, and still yet further such as at least 5° C. higher, including from 1° C. to 5° C. higher, than an otherwise identical or substantially similar batch composition that does not comprise methylcellulose showing a concentrated micro-calorimetry thermal response comprising, upon rehydration and dissolution, an exothermic peak of at least 52° C.

Compositions disclosed herein comprise inorganic-ceramic forming ingredients as well as organic ingredients or additives, wherein the organic ingredients or additives include at least one cellulose-based polymer.

The inorganic ceramic-forming ingredients may be synthetically produced materials such as oxides, hydroxides, etc., or they may be naturally occurring minerals such as clays, talcs, or any combination of these. Embodiments disclosed herein are not limited to the types of powders or raw materials. These may be chosen depending on the properties desired in the ceramic body.

In one set of exemplary embodiments, the inorganic ceramic-forming ingredients may yield an aluminum-titanate ceramic material upon firing. In other exemplary embodiments, the inorganic ceramic-forming ingredients may be those that yield cordierite, mullite, or mixtures of these on firing, some examples of such mixtures being about 2% to about 60% mullite, and about 30% to about 97% cordierite, with allowance for other phases, typically up to about 10% by weight.

One composition, by way of a non-limiting example, which ultimately forms cordierite upon firing is as follows in percent by weight: about 33-41, such as about 34-40 of aluminum oxide, about 46-53 such as about 48-52 of silica, and about 11-17 such as about 12-16 magnesium oxide.

The at least one cellulose-based polymer, which can act as a binder in the compositions disclosed herein, in at least one set of embodiments, comprises a methylcellulose showing a concentrated micro-calorimetry thermal response comprising, upon rehydration and dissolution, an exothermic peak below a transition onset temperature, wherein the exothermic peak has a maximum intensity at a temperature of at least 52° C., such as at least 53° C., and further such as at least 54° C., and yet further such as at least 55° C., including from 52° C. to 56° C.

In one set of exemplary embodiments, the methylcellulose is a hydroxypropyl methylcellulose (HPMC).

The hydroxypropyl methylcellulose (HPMC) can, for example, have a methoxy degree of substitution from about 1.6 to 2.0, such as from about 1.7 to 1.9, including about 1.8, and a hydroxypropyl molar substitution from about 0.10 to 0.25, such as from about 0.12 to 0.20, including about 0.13. Examples of hydroxypropyl methylcellulose include, but are not limited to F-type HPMC available from Dow Chemical as F240, SE-Tylose product Metalose MOB 20000 P4, and Aqualon product Culminal MHPC 20000 PFF.

The cellulose-based polymer can be present in the ceramic precursor batch composition in an amount of at least 1.0% on a weight percent by super addition basis, such as an amount ranging from about 1.0% to about 6.0% on a weight percent by super addition basis, and further such as an amount ranging from about 2.0% to about 5.0%, on a weight percent by super addition basis.

In exemplary embodiments at least 50%, such as at least 60%, and further such as at least 70%, and still further such as at least 80%, and yet still further such as at least 90%, and even further such as at least 95%, and yet even further such as at least 98%, and still yet even further such as at least 99% of the total amount of cellulose-based polymer in the ceramic precursor batch composition is a cellulose-based polymer comprising a methylcellulose, such as hydroxypropyl methylcellulose (HPMC), showing a concentrated micro-calorimetry thermal response comprising, upon rehydration and dissolution, an exothermic peak below a transition onset temperature, wherein the exothermic peak has a maximum intensity at a temperature of at least 52° C.

In exemplary embodiments, the ceramic precursor batch composition comprises inorganic ceramic-forming ingredients and a cellulose-based polymer, wherein essentially all of the cellulose-based polymer in the composition is a methylcellulose, such as hydroxypropyl methylcellulose (HPMC), showing a concentrated micro-calorimetry thermal response comprising, upon rehydration and dissolution, an exothermic peak below a transition onset temperature, wherein the exothermic peak has a maximum intensity at a temperature of at least 52° C.

In exemplary embodiments, the ceramic precursor batch composition comprises inorganic ceramic-forming ingredients and a cellulose-based polymer, wherein the cellulose-based polymer consists essentially of a methylcellulose, such as hydroxypropyl methylcellulose (HPMC), showing a concentrated micro-calorimetry thermal response comprising, upon rehydration and dissolution, an exothermic peak below a transition onset temperature, wherein the exothermic peak has a maximum intensity at a temperature of at least 52° C.

Compositions disclosed herein can also include at least one solvent. The solvent may provide a medium for the cellulose-based polymer to dissolve in thus providing plasticity to the ceramic precursor batch and wetting of the powders. The solvent may be aqueous based such as, but not limited to, water or water-miscible solvents. Most useful may be aqueous based solvents which provide hydration of the binder and powder particles. Typically, the amount of aqueous solvent may be from about 18% by weight to about 50% by weight, on a weight percent by super addition basis.

Compositions disclosed herein can also comprise at least one kosmotropic agent, such as a salt. The kosmotropic agent, such as a salt, can be present with the cellulose-based polymer (for example, in a system containing the cellulose-based polymer and a solvent) before the cellulose-based polymer is mixed with the other batch ingredients or the salt can be added as a separate ingredient or both. Examples of salts that can be used include sodium chloride, magnesium chloride, ferric chloride, sodium sulfate, aluminum sulfate, sodium carbonate, and sodium phosphate.

In certain exemplary embodiments, the at least one salt may be present in a solvent system containing cellulose-based polymers, such as HPMC. For example, the at least one salt can be present in the solvent system in a molar concentration of no greater than $1 \times 10^{-3}$, such as a molar concentration of from $0.01 \times 10^{-3}$ to $1 \times 10^{-3}$, including a molar concentration of from $0.05 \times 10^{-3}$ to $0.5 \times 10^{-3}$.

In certain exemplary embodiments, the at least one salt can be present in the solvent system containing cellulose-based polymers, such as HPMC, in a molar concentration of less than $0.01 \times 10^{-3}$. In certain exemplary embodiments, the solvent system containing cellulose-based polymers is essentially salt free.

Applicants have surprisingly found that when the salt content of a solvent system containing cellulose-based polymers, such as HPMC, is kept as low as possible, it can be easier to identify whether or not the cellulose-based polymers will correlate to a resulting ceramic precursor batch composition having sufficiently high $T_{onset}$.

The ceramic precursor batch composition may further comprise other additives such as surfactants, oil lubricants and pore-forming material. Non-limiting examples of surfactants that may be used in certain exemplary embodiments include $C_8$ to $C_{22}$ fatty acids and/or their salts or derivatives. Additional surfactant components that may be used with these fatty acids include $C_8$ to $C_{22}$ fatty esters, $C_8$ to $C_{22}$ fatty alcohols, and combinations of these. Exemplary surfactants include stearic, lauric, oleic, linoleic, palmitoleic acids, and their derivatives, stearic acid in combination with ammonium lauryl sulfate, and combinations of all of these. In an illustrative embodiment, the surfactant may be lauric acid, stearic acid, oleic acid, and combinations of these. The amount of surfactants typically may be from about 0.25% by weight to about 2% by weight, on a weight percent by super addition basis.

Non-limiting examples of oil lubricants may be light mineral oil, corn oil, high molecular weight polybutenes, polyol esters, a blend of light mineral oil and wax emulsion, a blend of paraffin wax in corn oil, and combinations of these. Typically, the amount of oil lubricants may be from about 1% by weight to about 10% by weight, on a weight percent by super addition basis. In an exemplary embodiment, the oil lubricants may be present from about 3% by weight to about 6% by weight, on a weight percent by super addition basis.

In filter applications, such as in diesel particulate filters, it may be desirable to include a pore forming material in the mixture in an amount effective to subsequently obtain the porosity required for efficient filtering. Examples of pore forming materials include particulate substances (not binders) that burn out of the green body in the firing step. Other pore forming materials do not burn out in the firing step. Some types of pore forming materials that may be used, although it is to be understood that embodiments herein are not limited to these, include non-waxy organics that are solid at room temperature, elemental carbon, and combinations of these. Some examples may be graphite, starch, cellulose, flour, etc. In one exemplary embodiment, the pore forming material may be elemental carbon. In another exemplary embodiment, the pore forming material may be graphite, which may have the least adverse effect on the processing. In an extrusion process, for example, the rheology of the mixture may be good when graphite is used. The pore forming material may be up to about 60% by weight as a superaddition. Typically, the amount of graphite may be from about 1% to about 50%, such as from about 3% to about 30% by weight based on the inorganic ceramic-forming ingredients. If a combination of graphite and flour are used, the amount of pore forming material may be typically from about 1% by weight to about 25% by weight with the graphite at 5% by weight to 10% of each and the flour at 5% by weight to about 10% by weight.

The disclosure also provides a method of producing a ceramic honeycomb body, comprising the steps of compounding inorganic ceramic-forming ingredients and a cellulose-based polymer, among other ingredients. The ingredients may be mixed in a muller or plow blade mixer. A solvent may be added in an amount that is less than is needed to plasticize the batch. With water as the solvent, the water hydrates the binder and the powder particles. The surfactant and/or oil lubricant, if desired, may then be added to the mix to wet out the binder and powder particles.

The precursor batch may then be plasticized by shearing the wet mix formed above in any suitable mixer in which the batch will be plasticized, such as, but not limited to, a twin-screw extruder/mixer, auger mixer, muller mixer, or double arm, etc. Extent of plasticization is dependent on the concentration of the components (binder, solvent, surfactant, oil lubricant and the inorganics), temperature of the components, the amount of work put in to the batch, the shear rate, and extrusion velocity. During plasticization, the binder dissolves in the solvent and a high viscosity fluid phase is formed. The binder formed is stiff because the system is very solvent-deficient. The surfactant enables the binder phase to adhere to the powder particles.

In a further step, the composition may be extruded to form a green honeycomb body. Extrusion may be done with devices that provide low to moderate shear. For example hydraulic ram extrusion press or two stage de-airing single auger are low shear devices. A single screw extruder is a moderate shear device. The extrusion may be vertical or horizontal.

It will be appreciated that honeycomb bodies disclosed herein may have any convenient size and shape and the disclosed embodiments are applicable to all processes in which plastic powder mixtures are shaped. The process may be especially suited to production of cellular monolith bodies such as honeycombs. Cellular bodies find use in a number of applications such as catalytic, adsorption, electrically heated catalysts, filters such as diesel particulate filters, molten metal filters, regenerator cores, etc.

Generally honeycomb densities range from about 235 cells/cm$^2$ (1500 cells/in$^2$) to about 15 cells/cm$^2$ (100 cells/in$^2$). Examples of honeycombs produced by embodiments herein, may include those having about 94 cells/cm$^2$ (about 600 cells/in$^2$), or about 62 cells/cm$^2$ (about 400 cells/in$^2$) each having wall thicknesses of about 0.1 mm (4 mils). Typical wall thicknesses may be from about 0.07 to about 0.6 mm (about 3 to about 25 mils), including from about 0.18 to 0.33 mm (about 7 to about 13 mils), although thicknesses of about 0.02-0.048 mm (1-2 mils) are also possible. Methods disclosed herein may be especially suited for extruding thin wall/high cell density honeycombs.

The extrudates may then be dried and fired according to known techniques. The firing conditions of temperature and time may depend on the composition and size and geometry of the body, and embodiments herein are not limited to specific firing temperatures and times. For example, in compositions which are primarily for forming cordierite, the temperatures may typically be from about 1300° C. to about 1450° C., and the holding times at these temperatures may be from about 1 hour to about 6 hours. For mixtures that are primarily for forming mullite, the temperatures may be from about 1400° C. to about 1600° C., and the holding times at these temperatures may be from about 1 hour to about 6 hours. For cordierite-mullite forming mixtures which yield the previously described cordierite-mullite compositions, the temperatures may be from about 1375° C. to about 1425° C. For mixtures that are primarily for forming aluminum titanate, the temperatures may be from about 1350° C. to about 1500° C. and the holding times at these temperatures may be from about 10 hours to about 20 hours. Firing times depend on factors such as kinds and amounts of materials and nature of equipment but typical total firing times may be from about 20 hours to about 80 hours. For metal bodies, the temperatures may be about 1000° C. to 1400° C. in a reducing atmosphere preferably hydrogen. Firing times depend on factors as discussed above but may be typically at least 2 hours and typically about 4 hours. For zeolite bodies, the temperatures may be about 400° C. to 1000° C. in air. Firing times depend on factors as discussed above but may be typically about 4 hours.

Concentrated Micro-Calorimetry Test Method

The following concentrated micro-calorimetry test method was used to determine the concentrated micro-calorimetry thermal response of cellulose-based polymers described herein. HPMC was the cellulose-based polymer used in the test method. The test method, which involves a type of solution micro-calorimetry method, provides a sensitive analytical technique used to measure the endothermic heat of dehydration for HPMC upon heating as well as the exothermic heat of rehydration and dissolution for HPMC upon cooling. Under heating, HPMC undergoes dehydration and eventually gelation, which is captured by an endothermic response in the micro-calorimeter. The endothermic peak(s) is the response due to the thermal transition of HPMC from a hydrophilic solute to a hydrophobic gel. Upon cooling, HMPC undergoes rehydration and dissolution, which is captured by an exothermic response in the micro-calorimeter. The exothermic peak is the response due to the thermal transition of HPMC from a hydrophobic gel to a hydrophilic solute.

The concentrated micro-calorimetry test method involves mixing an amount of HPMC, alumina (A10), and water as a sample preparation, and then analyzing the thermodynamic response of the sample upon heating and cooling. The test method can include one of two sample preparation techniques, each of which provide comparable results. The first sample preparation technique involves dry blending 400 grams of alumina (A10) with 23.14 grams of HPMC for two minutes in a Quisinart mixer at a speed of 4 on the mixer dial. While the powder is mixing, 90 grams of water is added slowly to the dry mix. After the addition of all of the water, the speed on the mixer is increased until thorough blending is achieved. The damp powder is removed from the mixing bowl and poured into a beaker for loading into a Brabender to form an alumina batch for extrusion. The alumina batch is run at 50 rpm in the Brabender until 100 kJ of energy is achieved. The material is removed from the Brabender and rolled out onto a glass top and cut into pieces for loading into an Instron where it is put under vacuum and pressure to remove air and form a billet for extruding into a rod. Two 13 millimeter rods are extruded to be tested using a capillary rheometer. A section of the extruded rod is set aside for micro-DSC analysis.

The second sample preparation technique involves placing 2.3 grams of alumina (A10) into a 15 milliliter centrifuge tube along with 0.135 grams of HPMC and mixing the dry material at least 5 minutes in a lab-quake. To this mixture was added 0.540 milliliters of ultra-pure water, which was mixed into the mixture using a mortar and pestle until a consistent paste was achieved. The mixture was placed in Saran™ wrap until being loaded into an ampoule for immediate testing (within 30 minutes of mixing).

Samples prepared in accordance with the methods described above were equilibrated to room temperature before being placed in the calorimeter. The standard testing parameters were an isothermal hold at 26° C. for 20 minutes followed by a temperature ramp at 0.7° C./minute from 26 to 100° C. Then a cooling profile was used from 100 to 26° C. at 0.7° C./min. Both endothermic de-hydration and exothermic re-hydration events were recorded.

An exothermic rehydration and dissolution event or exothermic response upon cooling is a micro-calorimetry thermal response having a fingerprint that includes at least one "peak" using the above-described test method. The exothermic response begins when the temperature of the solution reaches the transition onset temperature, which is when the micro-calorimetry thermal response exhibits a transition from a gelled state to a soluble state. At temperatures above the transition onset temperature, the solution in the above-described test method exhibits an approximately constant decrease in temperature per amount of heat removed from the solution. At the transition onset temperature and in a temperature range below it, the solution temperature decrease per the amount of heat removed deviates from that observed above the transition onset temperature. A temperature below the transition onset temperature at which this deviation reaches a localized maximum is a peak at its maximum intensity.

Method to Determine $T_{onset}$

Tonset was determined using a capillary temperature sweep method. An alumina paste mixture prepared by a sample preparation technique described above was loaded into twin barrels of a capillary rheometer having a zero length die at the end of the right barrel and a 16 mm length die at the end of the left barrel. Both dies have a 1 millimeter diameter hole. The temperature was increased from room temperature at a rate of about 1° C. per minute while the paste was extruded at a speed of ½" per second (piston speed of about 3.39 millimeters per minute). Both barrels were extruded simultaneously. After all the data is collected, it is analyzed by a macro that calculates the $T_{onset}$ of the material.

Applicants have surprisingly found that certain ceramic precursor batch compositions having certain cellulose-based polymers included as a binder material can exhibit increased $T_{onset}$. Specifically, applicants have found that when methylcellulose, and particularly hydroxypropyl methylcellulose (HPMC), showing a concentrated micro-calorimetry thermal response comprising, upon rehydration and dissolution, an exothermic peak below a transition onset temperature, wherein the exothermic peak has a maximum intensity at a temperature of at least 52° C. is used, increased $T_{onset}$ can be achieved.

The disclosure and scope of the appended claims will be further clarified by the following examples.

EXAMPLES

A series of mixtures containing HPMC, alumina (A10), and water were prepared in accordance with a sample preparation technique described above. With respect to ingredient selection, the only variable that was changed was the HPMC. Specifically, an F-type HPMC from a series of different manufacturer lots was used in each of Samples 1-17, for which a concentrated micro-calorimetry thermal response was determined using the concentrated micro-calorimetry test method described above and for which a $T_{onset}$ was determined using the method to determine $T_{onset}$ described above. Two experimental runs were conducted for each sample. The results are set forth in Table 1.

TABLE 1

| Sample No. | Average $T_{onset}$ (° C.) | μ-DSC rehydration and dissolution peak temperature (° C.) |
|---|---|---|
| 1 | 56.61 | 55.78 |
| 2 | 56.57 | 54.92 |
| 3 | 53.14 | 53.53 |
| 4 | 51.83 | 52.23 |
| 5 | 51.45 | 52.15 |
| 6 | 50.72 | 52.08 |
| 7 | 49.70 | 51.60 |
| 8 | 49.53 | 51.46 |
| 9 | 49.60 | 51.43 |
| 10 | 50.50 | 51.40 |
| 11 | 49.51 | 51.40 |
| 12 | 49.63 | 51.40 |
| 13 | 50.51 | 51.31 |
| 14 | 49.83 | 51.28 |
| 15 | 50.22 | 51.23 |
| 16 | 50.14 | 50.80 |
| 17 | 49.83 | 50.74 |

Using Sample 3 as a reference, a difference or offset for each of the other samples (relative to Sample 3) can also be determined with respect to both $T_{onset}$ and μ-DSC rehydration and dissolution peak temperature, as set forth in Table 2.

TABLE 2

| Sample No. | Average $T_{onset}$ offset (° C.) | μ-DSC rehydration and dissolution peak temperature offset (° C.) |
|---|---|---|
| 1 | 3.47 | 2.25 |
| 2 | 3.43 | 1.39 |
| 3 | 0.00 | 0.00 |
| 4 | -1.31 | -1.30 |
| 5 | -1.69 | -1.38 |
| 6 | -2.42 | -1.45 |
| 7 | -3.45 | -1.93 |
| 8 | -3.61 | -2.07 |

TABLE 2-continued

| Sample No. | Average $T_{onset}$ offset (° C.) | µ-DSC rehydration and dissolution peak temperature offset (° C.) |
|---|---|---|
| 9 | −3.55 | −2.10 |
| 10 | −2.64 | −2.13 |
| 11 | −3.63 | −2.13 |
| 12 | −3.51 | −2.13 |
| 13 | −2.63 | −2.22 |
| 14 | −3.31 | −2.25 |
| 15 | −2.92 | −2.30 |
| 16 | −3.00 | −2.73 |
| 17 | −3.31 | −2.79 |

As can be seen from Tables 1 and 2, a strong correlation exists between the concentrated micro-calorimetry thermal response fingerprint of a given cellulose-based polymer, such as HPMC, and $T_{onset}$. FIG. 1 plots the relationship between peak maximum intensity temperature upon rehydration and dissolution of F-type HMPC using the concentrated micro-calorimetry test method disclosed herein and $T_{onset}$. As can be seen, a strong linear relationship exists between the peak maximum intensity temperature of the HPMC and $T_{onset}$. This relationship can be expressed mathematically as:

$$y_{T_{onset}} = 1.55 x_{\mu\text{-}DSC} + 0.31$$

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention as set forth in the appended claims. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A ceramic precursor batch composition comprising:
   inorganic ceramic-forming ingredients and a cellulose-based polymer, wherein the cellulose-based polymer comprises a methylcellulose showing a concentrated micro-calorimetry thermal response comprising, upon rehydration and dissolution, an exothermic peak below a transition onset temperature, wherein the exothermic peak has a maximum intensity at a temperature of at least 52° C.

2. The composition of claim 1, wherein the methylcellulose is a hydroxypropyl methylcellulose (HPMC).

3. The composition of claim 2, wherein the hydroxypropyl methylcellulose (HPMC) has a methoxy degree of substitution from about 1.6 to 2.0 and a hydroxypropyl molar substitution from about 0.10 to 0.25.

4. The composition of claim 1, wherein at least 50% of the cellulose based polymer in the composition comprises a methylcellulose showing a concentrated micro-calorimetry thermal response comprising, upon rehydration and dissolution, an exothermic peak below a transition onset temperature, wherein the exothermic peak has a maximum intensity at a temperature of at least 52° C.

5. The composition of claim 1, wherein the exothermic peak has a maximum intensity at a temperature of at least 53° C.

6. The composition of claim 1, wherein the exothermic peak has a maximum intensity at a temperature of at least 54° C.

7. A method of producing a ceramic precursor batch composition, the method comprising compounding:
   inorganic ceramic-forming ingredients; and
   a cellulose-based polymer;
   wherein the cellulose-based polymer comprises a methylcellulose showing a concentrated micro-calorimetry thermal response comprising, upon rehydration and dissolution, an exothermic peak below a transition onset temperature, wherein the exothermic peak has a maximum intensity at a temperature of at least 52° C.

8. The method of claim 7, wherein the methylcellulose is a hydroxypropyl methylcellulose (HPMC).

9. The method of claim 8, wherein the hydroxypropyl methylcellulose (HPMC) has a methoxy degree of substitution from about 1.6 to 2.0 and a hydroxypropyl molar substitution from about 0.10 to 0.25.

10. The method of claim 7, wherein at least 50% of the cellulose based polymer in the composition comprises a methylcellulose showing a concentrated micro-calorimetry thermal response comprising, upon rehydration and dissolution, an exothermic peak below a transition onset temperature, wherein the exothermic peak has a maximum intensity at a temperature of at least 52° C.

11. The method of claim 7, wherein the exothermic peak has a maximum intensity at a temperature of at least 53° C.

12. The method of claim 7, wherein the exothermic peak has a maximum intensity at a temperature of at least 54° C.

* * * * *